Patented Aug. 4, 1931

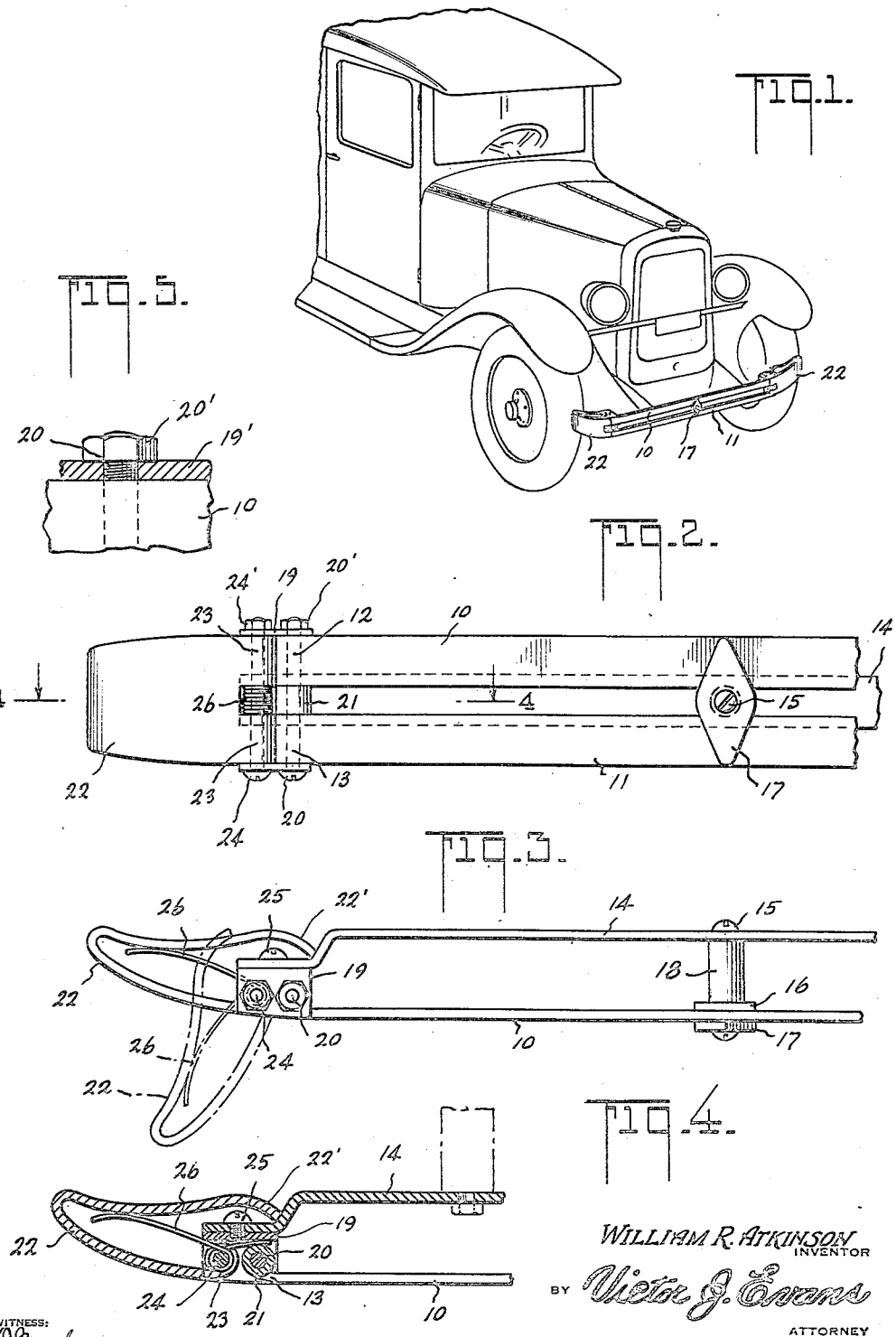

1,817,866

UNITED STATES PATENT OFFICE

WILLIAM R. ATKINSON, OF WINFIELD, NEW YORK, ASSIGNOR OF ONE-THIRD TO JOSEPH A. BROWN, OF WINFIELD, NEW YORK

AUTOMOBILE BUMPER

Application filed June 20, 1930. Serial No. 462,643.

This invention relates to automobile bumpers and has for its object the provision of a bumper which may be mounted upon the front or rear of an automobile and which has end portions hingedly mounted on its main or central portion so that in case said automobile is backing and catches its bumper in the bumper or fender of another car or other obstruction the end may swing and prevent injury.

Another object of the invention is to provide an automobile bumper which will receive and stop a blow directed toward the body of said automobile but which will yield under stress or force thereon exerted away from said automobile and which will be as attractive in appearance as the conventional type of rigid bumper and cost but slightly more to manufacture by reason of the simplicity of construction.

Other objects and advantages of the invention will be hereinafter specifically pointed out, or will become apparent, as the specification proceeds.

With the above indicated objects in view, the invention resides in certain novel constructions and combinations and arrangement of parts, clearly described in the following specification and fully illustrated in the accompanying drawings, which latter show embodiments of the invention as at present preferred.

In the drawings, which illustrate a preferred embodiment of the invention,

Fig. 1 is a perspective view, showing the bumper attached to the front of an automobile.

Fig. 2 is a front elevation partially in section, of the left hand half of the bumper.

Fig. 3 is a top plan view of the same, showing in dot and dash lines the swinging position of the end portion of the bumper.

Fig. 4 is a section on the line 4—4 of Fig. 2.

Fig. 5 is an enlarged detail of the bolt mechanism showing the threaded portion of the bracket member.

The embodiment herein illustrated preferably includes a bumper having spaced top and bottom front bars 10 and 11, constructed preferably of steel, which are provided at their ends with hinge eyes 12 and 13 and a single rear support bar 14. The two front bars 10 and 11 and the rear bar 14 are connected at their middles by means of a bolt 15 through said rear bar and through oppositely disposed plates 16 and 17 mounted on the front bars, a bushing 18 being employed to maintain said front and rear bars in spaced relation.

The front bars 10 and 11 are secured at their ends by means of a bracket 19 and a bolt 20 which runs through holes in the shoulder portions of said bracket and through the hinge eyes 12 and 13 in said bars, a bushing 21 being employed for spacing said front bars.

The extension member 22 is constructed preferably of steel and is provided with hinge eyes 23 through which a bolt 24 passes, hingedly mounting said projecting member to said bracket. In order to lock the nuts 20' and 24' on the bolt members 20 and 24 the holes in the upper shoulder 19' of the bracket 19 are threaded as shown in Fig. 5, said bolts being screwed into said threaded holes and being locked in place by means of said nuts.

The rear support bar 14 is secured to the bracket member 19 by means of a screw 25 which in this instance is screwed into a threaded hole in said bracket as indicated in Fig. 4.

This bumper is normally intended to receive a blow coming in the direction of the automobile to which the said bumper is attached and when all or any part of such blow is received by the extension portion 22, the extension portion will give slightly due to the spring like construction of this member, but will be prevented from moving backwards beyond its normal position by means of the support offered to the foot portion 22' of said extension member by the shoulder portion of the rear support bar 14 which the end of the foot portion 22' normally engages.

When, however, pressure is exerted on said extension member from the rear, as shown in Fig. 3, another automobile passes one equipped with the present bumper so that a part of the passing car engages the extension member of said bumper, or when a vehicle equipped with the present bumper is parking in close quarters and engages the bumper or fender of another car, said extension member will move forward to a position almost at right angles with the main support bar as indicated in Fig. 3 and when the obstruction is passed, said extension member will move quickly back into its normal position by means of a spring member 26, the bolt member 24 passing through a spiral portion of said spring member and holding same in an opening in said extension member 22 between the hinge eyes 23 on the hinged end thereof. One end of the spring 26 is engaged against the front side of the rear portion of the extension member, the other end of the spring member engaging the inner side of the bracket member 19.

The hereinbefore described construction admits of considerable modification without departing from the invention; therefore, I do not wish to be limited to the precise arrangements shown and described, which are as aforesaid, by way of illustration merely. In other words, the scope of protection contemplated is to be taken solely from the appended claims, interpreted as broadly as is consistent with the prior art.

What I claim as new is:—

1. An automobile bumper including a central portion and extension portions hingedly mounted on each end thereof, the ends of said central portion and said extension portions having hinge eyes, a bracket member for mounting each extension portion, said bracket member including a back portion and shoulder portions, said shoulder portions having a plurality of holes, two of said holes being threaded, a plurality of bolts, nuts for said bolts, said bolts adapted to pass through the holes in said bracket member and through said hinge eyes in said central and extension portions, said threaded holes coacting with said nuts to lock said bolts, and a spring member engaged by one of said bolts and adapted to urge said extension member in a predetermined backward position.

2. An automobile bumper comprising a central element, an extension element hingedly mounted at each end of said central element, a U-shaped bracket member for mounting said extension element on the ends of said central element, said central element comprising front and rear bars, said rear bar having a shoulder portion at each end thereof, said extension element having a foot portion adapted to rest against said shoulder portion on said rear bar, preventing said extension element from moving backwards beyond a predetermined position, said bracket member including a back portion and shoulder portions having holes to receive bolts for engaging the ends of said central element and said extension element two of said holes carrying threads to engage the nuts on said bolts to lock said nuts.

3. An automobile bumper including a central portion adapted to be secured to a vehicle frame, and extension portions hingedly mounted at each end of said central portion, said central portion including front and rear elements, said rear element having a shoulder portion at each end thereof, a U-shaped bracket structure bolted to each end of said central portion, said extension portions hingedly mounted to said brackets, a threaded portion in the holes in said bracket member through which said bolts pass, said threaded holes and said nuts constituting a locking device for said bolts.

In testimony whereof I hereby affix my signature.

WILLIAM R. ATKINSON.